June 11, 1935.  J. WORMS  2,004,845
BOGIE FOR VEHICLES TRAVELING UPON RAILS
Filed Oct. 6, 1932  3 Sheets-Sheet 2
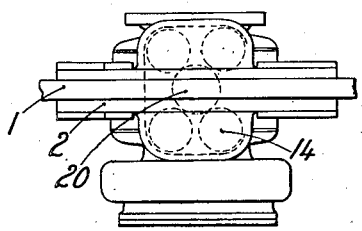
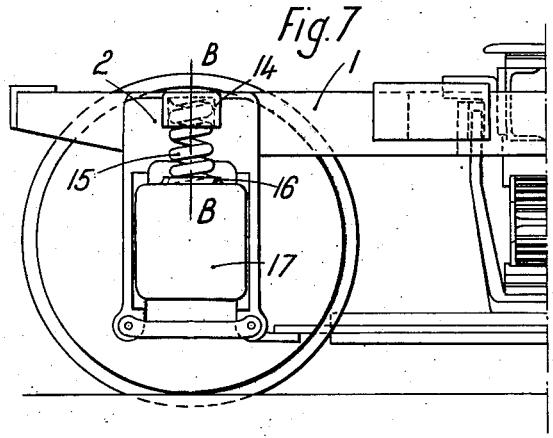
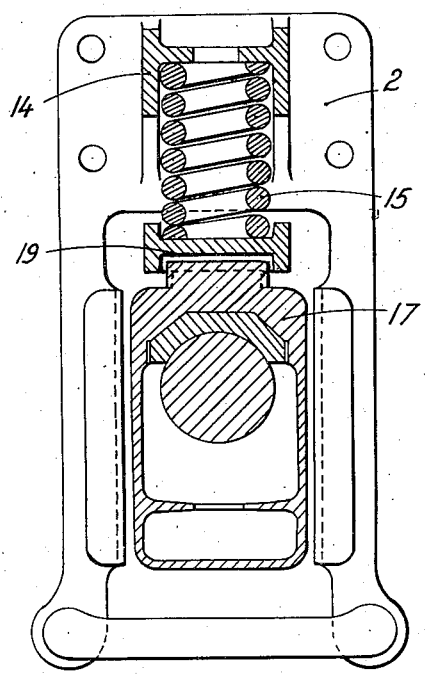
J. Worms
INVENTOR
By Marks & Clerk
Attys.

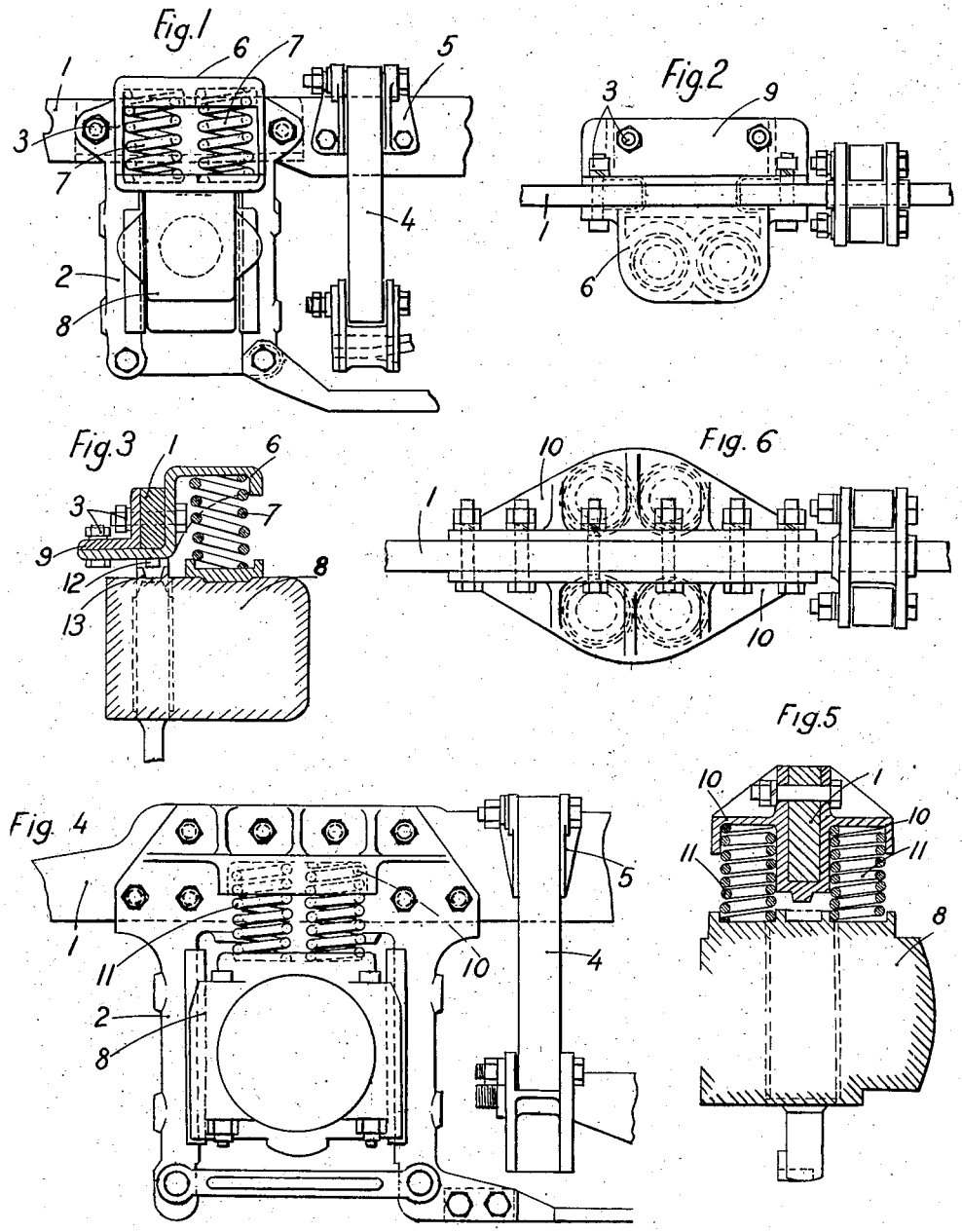

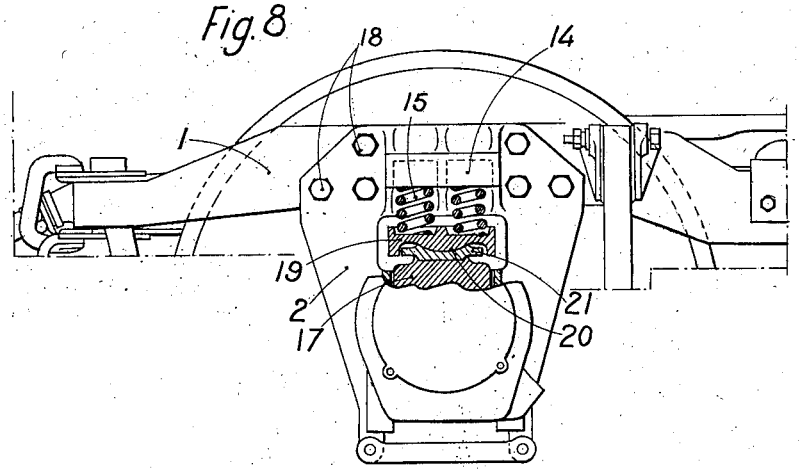
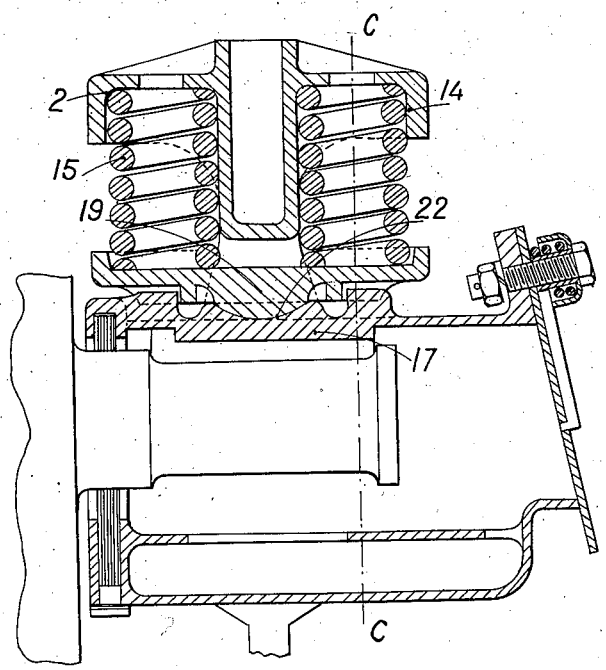

Patented June 11, 1935

2,004,845

UNITED STATES PATENT OFFICE 2,004,845

BOGIE FOR VEHICLES TRAVELING UPON RAILS

Jacques Worms, Versailles, France

Application October 6, 1932, Serial No. 636,601
In France October 14, 1931

2 Claims. (Cl. 105—224)

The invention has for object certain new and useful improvements of the composite side frames for bogie trucks, and the arrangement of the suspension of the truck frames, in which said side frames are embodied, directly upon the journal boxes by means of helical springs.

When bogie trucks are not equipped with equalizer bars resting directly upon the journal boxes, the distribution and the equalization upon the journal boxes of the load superimposed upon the pivot of the bogie is obtained through the medium of the truck frame and of the journal box springs.

On account of the fact that this load may happen not to be equally balanced upon the journal box springs by means of the truck frame, it is necessary to make the capacity of these springs as large as possible. On the other hand and as the space available on top of the journal boxes to install the journal box springs, when they are made of helical springs, is generally a very restricted one, these springs can be only made with a reduced flexibility, and which then may prove not to be sufficient to provide to the rolling stock the proper stability, when it happens to pass upon inequalities of the track of some magnitude.

This makes it desirable to compensate, as much as possible, the lack of flexibility of the journal box springs, by arranging the truck frame to be such as it can somewhat yield, so that it can then, and when necessary, instantaneously warp, while such warping ought not have the effect to cause any permanent deformation of the truck frame.

In order to obtain this result it is desirable to reduce to the minimum the cross section of the various members of the truck frame and above all that of the side frames which latter are the members of the truck frame which are the more instrumental in obtaining the equalization of the load on the journal box springs, thus to increase as much as possible the amount at which the center or body of the side bar proper is stressed.

It is obvious then that for this reason it is preferable to make this side bar a forging, and its center specially a forged bar, rather than a casting, rather even than a pressing and rather also than to use shapes for the manufacture of the center of the side bar, as pressings or shapes would not lend themselves as well, as forged or even rolled bars to the arrangement, towards the middle and at the ends of the center of the side bar, of the proper assemblages, and to assemblages that are such as to allow the truck frame to warp instantaneously.

This reduction of the cross-section of the center or body of the side bars, which causes to have to use for their manufacture flat forged or rolled bars disposed edgewise, is a general necessity.

To obtain the results that are sought by the reduction of the cross section of the body of the side bars is further facilitated when the load carried on the pivot of the bogie, instead of being transferred in the conventional manner to the side bars towards their middle through the center transom of the truck frame, is transferred directly to the side bars and suspended therefrom at points in the close vicinity of the points of rest of the side bars upon the journal box springs disposed above the journal boxes.

The side bars used with this method of supporting the load are frequently forged side bars, at the ends of which, and integral with their body, are formed drop forged yokes, by which the journal boxes are guided as usual, and which mutually drive each other.

The forged side bars are however costly, and in certain instances to the forged yokes, integral with the body of the side bar, have been substituted independent cast yokes, firmly secured to the body of the side bar, which body or center consists of a forged, or even rolled, flat bar disposed edgewise, and the side bars thus obtained do rest directly upon the journal boxes through helical springs.

The transfer of the load to the journal boxes in bogie trucks, where such composite side bars are used, is really performed by means of the body of the side bar, next by means of the yokes and next again by the helical journal box springs.

In order to insure the permanent squareness of the truck frame it is necessary to mount the flat bars constituting the center of the side bars at the top part of the yokes, in such a manner that they can be as securely assembled with the yokes as it is possible, at points adjacent to the downward projections between which slide the journal boxes, and preferably on either side of the location thus provided for them. It can thus, be easily realized that the distance between the top of the body of the side bar and the rail, at points above the journal boxes for a given wheel diameter, a given height of the journal boxes above the horizontal plane passing through the center line of the axles, and a given height of the journal box springs, will then be greater than the corresponding height with forged side bars having forged yokes formed integral with the center of the side bar.

In order to obviate this drawback the journal box springs, in some instances, have been arranged to be carried not directly on the top of the journal box castings but on both sides of the journal boxes in the lengthwise direction of the side bar. However such arrangements are more expensive than the arrangement covered by the present invention, while on the other hand they are defective as they result in an increase of the unsprung weight, which on the contrary should be reduced by all possible means. Furthermore, and with the arrangements above referred to, it is not possible in those trucks, where the load is transferred to the side bars in the close vicinity of their points of rest on the journal boxes, to suspend from the side bars as close to these points of rest as would be necessary, the devices whereby the load borne on the pivot of the bogie is transferred to the side bars.

The present invention has for its object improvements by which all such drawbacks are obviated.

For this purpose in conformity with the invention, the journal box springs are located above the journal boxes and either against one of the longitudinal vertical sides of the side bars or against the two longitudinal vertical sides of them, towards the top of the yokes where is performed the assembly of the top center of the side bars with the yokes. The first of the above two arrangements is the one to be preferred in the case of bogies having a comparatively small carrying capacity. The second one is to be preferred for the bogies of large capacity.

The center of the side bar bears by its bottom horizontal face in a recess formed inside the top part of the yoke, and accurately machine finished, it is forced in that recess, and rests on its bottom.

The walls of this recess have cast integral with them, on the outer face of one of them, or of both, projections or wings against which are applied the top of the journal box springs and which constitute the caps of these springs.

As explained, these journal box springs carry the yokes which in turn carry, and on a horizontal portion of the greatest possible length, the body of the side bar, this to minimize the wearing stresses to which are subjected the bolts fastening the body of the side bars to the yokes when the cars are in operation and chiefly when they are started or when the brakes are applied.

It is generally preferable to use upon each given side of the side bar instead of one single spring or of one single nest of springs two springs or nests of springs.

This substitution has on one hand the advantage of reducing the outward projection due to the use of one single spring of the cap cast integral with the yoke with reference to the body of the side bar, while on the other hand it enables the use of springs in which the ratio between the height of the spring and the diameter of its bar, and also the outer diameter of the spring, is more favourable than in the case of single springs, and this applies, in the case of nests of springs, to the outer spring of each nest. This second advantage is of great importance, since in the case of a single spring, or nest of springs, the question of the proportion between the height of the spring and the diameter of its bar, with reference to the outer diameter of the spring, in the case of a single spring or of the outer spring of a nest as well makes often very difficult the manufacture of these springs, due to the fact that for a given flexibility which is to be obtained, account must be taken of the restricted space, and chiefly in height, usually available for the springs, and of the loads which they have to carry.

In order to further improve the operating conditions of such pairs or sets of springs, and to prevent small differences in the flexibility of the individual springs (each of which springs may even consist of a nest of springs) composing such pairs or sets, from offering prejudice to the equalization of the load between the springs and hence upon the journal boxes and the axle journals, such pairs or sets will not rest directly upon the top of the journal box, but will be mounted thereon through the medium of a suitable centering device having preferably, on the lower face of a member forming a seat for the springs, a spherical portion in the case of a set of springs, or a cylindrical portion in the case of pairs of springs, and the generatrixes of which will then be either parallel or perpendicular to the axle journal, depending on whether the springs of the pairs are located on the same face or on both faces of the yoke and of the side bar. This member which serves as a seat for the springs may rest directly upon the top of the axle box which is given the proper shape to receive it, but it will preferably rest upon a suitable support which is mounted in turn, in the known manner, upon the top of the axle box.

The use of this centering device improves the operating conditions of the springs, and further, by centering the load upon the axle journals, it ensures a better distribution of the load upon these latter, thus effecting a reduction and a more uniform distribution of the wear of the journals and bearings.

This special seat for the journal box springs is used for the sole purpose as above set forth.

The seat is quite independent of the bogie frame itself. It is not directly secured to this frame, and in no case will it come into contact with the latter. It rests, as above stated, upon the journal box casting, which is mounted in the frame in the conventional manner, and which is also independent of the frame.

The accompanying drawings show various embodiments of the invention.

Figs. 1, 2 and 3 represent a constructional form of the suspension device, as a longitudinal elevational view, a plan view, and a cross-section, in the case in which the springs resting upon the axle box are disposed on one side of the side bar only.

Figs. 4, 5 and 6 show a similar construction, as a longitudinal elevational view, a plan view, and a cross-section, in the case in which the springs resting upon the journal box are disposed on both sides of the sole bar.

In the bogies represented in Figs. 1 to 6, the load is transferred to the side bars at points close to the yokes, and is suspended therefrom by pairs of links, but it might be suspended by single links or even by straps.

Fig. 7 is an elevational view of one-half of a bogie wherein the load is supported by the center transoms of the truck frame in the conventional manner.

Fig. 8 is an elevational view, partly in section, of a portion of a bogie in which the load is supported by each journal box through the medium of a set of four helical springs resting upon a seat which rests in turn, by a spherical surface, upon a member mounted on the axle box.

Fig. 9 is a plan view on a smaller scale corresponding to Fig. 8.

Fig. 10 is a vertical section on the centre line of the axle of a yoke supported on the journal box by means of a pair of helical springs located on either side of the side bar and resting upon a seat mounted on the journal box by a cylindrical surface whose generartic is perpendicular to the centre line of the axle.

Fig. 11 is a section on the line C—C of Fig. 10.

In the construction shown in Figs. 1, 2 and 3, the yoke is provided, cast integral with it, preferably on its outer face, with a cap 6 which rests upon a set of helical springs 7 mounted upon the top of the journal box 8 and outside of the bogie frame, which latter is driven by means of the pedestals of the said yoke fitted with wear plates disposed inwardly of the side bar center 1 resting upon the said yoke 2. The yoke is assembled with the side bar by bolts 3, and the bar further rests upon a flat part of the yoke which has a considerable length, and in this device the whole is further strengthened by the use of an L-shaped member 9 which is secured to the yoke by bolts 3 located in two perpendicular planes (Fig. 3).

This method of assembling is given by way of example, and may be replaced by an arrangement similar to that shown in Figs. 4, 5 and 6, but wherein spring caps would be cast integral with the yoke on only one of the two faces of the yoke, and preferably the outer face.

In Figs. 4, 5 and 6, the yoke 2 has upon its outer and inner faces suitable caps 10 for the springs 11 of the journal box, said caps being cast integral with the yoke, and the side bar is forced into a groove formed in the yoke between the outer walls against which the journal box springs are disposed.

In both cases, it is generally preferable to use two springs instead of a single spring on one side of the side bar, in order to reduce the amount by which the springs and their caps extend outwardly of the yoke with reference to the body of the side bar.

The yoke box may be further provided, in both these cases, with a stop 12 adapted to engage in a recess 13 formed upon the top of the journal box in case of breakage of the box springs, which prevents all undue drop of the bogie frame, and the stop may also serve to prevent the said springs to close solid.

In the bogies represented in Figs. 1 to 6, the load is supported by the side bars by means of links which are close to the journal boxes, but in Fig. 7, the invention is applied to a bogie in which the load is transferred to the side bars by means of the center transoms. The side bar 1 rests upon the yoke 2 in a suitable recess, and the yoke carries wings 14 which bear upon helical springs 15 mounted on seats 16 located on the journal boxes 17. Two springs are provided, one on each side of the sole bar, but it is evident that the apparatus might comprise a different number of springs having various positions.

In the construction shown in Figs. 8 and 9, the side bar 1 is forced in a recess formed in the upper part of the yoke 2, and is secured to the latter by bolts 18; said yoke carries a boss 14 on either side of the side bar, in contact with the respective helical springs 15 which rest upon a seat 19, resting in turn upon the spherical part 20 of a member 21 mounted on the journal box 17.

In the construction shown in Figs. 10 and 11, the side bar 1 is also forced in a recess formed in the top of the yoke 2, and this latter carries a wing on either side of the side bar, resting upon a respective helical spring 15 which bears upon a seat 19, resting upon the axle box 17 by means of a cylindrical surface 22 whose generatrixes are perpendicular to the centre line of the axle.

What is claimed is:

1. In a bogie truck, the combination of journal box castings with a truck frame, each side bar of which is a single flat bar, cast yokes having a groove in which rests said side bars and a cap at the top of the outer face of one of the vertical walls of said groove, helical springs disposed on the top of said journal box castings and located along side of one vertical face of said cast yokes and of said side bars for supporting said yokes by means of said cap, bolts for securing said yokes to said side-bars, and means for suspending the load from said side-bars in the closest possible vicinity of the axle journals.

2. In a bogie truck the combination of journal box castings with a truck frame each side bar of which is a single flat bar, cast yokes having a groove in which rests said side bars and a cap at the top of the outer face of both vertical walls of said groove, helical springs disposed on the top of said journal box castings and located alongside of each vertical face of said cast yokes and of said side bars for supporting them by means of said cap, bolts for securing said yokes to said side-bars, and means for suspending the load from said side-bars in the closest possible vicinity of the axle journals.

JACQUES WORMS.